US008565446B1

(12) United States Patent
Ebenezer

(10) Patent No.: US 8,565,446 B1
(45) Date of Patent: Oct. 22, 2013

(54) ESTIMATING DIRECTION OF ARRIVAL FROM PLURAL MICROPHONES

(75) Inventor: Samuel Ponvarma Ebenezer, Tempe, AZ (US)

(73) Assignee: Acoustic Technologies, Inc., Mesa, AZ (US)

( * ) Notice: Subject to any disclaimer, the term of this patent is extended or adjusted under 35 U.S.C. 154(b) by 897 days.

(21) Appl. No.: 12/657,002

(22) Filed: Jan. 12, 2010

(51) Int. Cl.
*H04B 15/00* (2006.01)
*H04R 3/00* (2006.01)

(52) U.S. Cl.
USPC ............ 381/94.1; 381/92; 381/94.7; 381/122

(58) Field of Classification Search
USPC .......... 381/71.1, 71.11, 71.12, 73.1, 91, 94.1, 381/94.7, 92, 122; 379/406.01, 406.05, 379/406.07–406.09; 704/226–228, 233
See application file for complete search history.

(56) References Cited

U.S. PATENT DOCUMENTS

| | | | | |
|---|---|---|---|---|
| 5,793,875 | A | 8/1998 | Lehr et al. | 381/68.1 |
| 6,999,541 | B1 | 2/2006 | Hui | 75/350 |
| 7,146,013 | B1 | 12/2006 | Saito et al. | 381/92 |
| 7,218,741 | B2 | 5/2007 | Balan et al. | 381/92 |
| 7,289,586 | B2 | 10/2007 | Hui | 375/349 |
| 7,346,175 | B2 | 3/2008 | Hui et al. | 381/74 |
| 7,426,464 | B2 * | 9/2008 | Hui et al. | 704/227 |
| 7,657,038 | B2 * | 2/2010 | Doclo et al. | 381/94.1 |
| 7,688,985 | B2 * | 3/2010 | Roeck | 381/92 |
| 8,009,840 | B2 * | 8/2011 | Kellermann et al. | 381/92 |
| 8,194,872 | B2 * | 6/2012 | Buck et al. | 381/71.11 |
| 2009/0012779 | A1 * | 1/2009 | Ikeda et al. | 704/205 |
| 2009/0226005 | A1 * | 9/2009 | Acero et al. | 381/92 |
| 2010/0177908 | A1 * | 7/2010 | Seltzer et al. | 381/92 |
| 2011/0026730 | A1 * | 2/2011 | Li et al. | 381/92 |
| 2011/0069846 | A1 * | 3/2011 | Cheng et al. | 381/92 |
| 2011/0103626 | A1 * | 5/2011 | Bisgaard et al. | 381/313 |

OTHER PUBLICATIONS

C. H. Knapp and G. C. Carter, "The generalized correlation method for estimation of time delay", *IEEE Trans. Acoustics, Speech, and Signal Processing*, vol.ASSP-24, pp. 320-327, Aug. 1976.

J. Benesty, J. Chen, and Y. Huang, "Time-Delay estimation via linear interpolation and cross correlation," *IEEE Transactions on Speech and Audio Processing*, vol. 12, No. 5, Sep. 2004.

(Continued)

*Primary Examiner* — Vivian Chin
*Assistant Examiner* — David Ton
(74) *Attorney, Agent, or Firm* — Cahill Glazer PLC

(57) ABSTRACT

A noise suppression system includes plural microphones, a fixed beam former, a blocking matrix, plural adaptive filters, and a direction of arrival circuit coupled to the adaptive filters that prevents the filters from adapting in the presence of a signal in the look direction. The direction of arrival circuit causes the filters to adapt more quickly in the absence of a signal in the look direction. A pair of adjustable gain circuits is coupled to each microphone. A first adjustable gain circuit from each pair is calibrated during the presence of a desired signal and a second adjustable gain circuit from each pair is calibrated during the presence of an interfering signal. A fixed null-forming circuit is coupled to a first pair of variable gain circuits and an adaptive null forming circuit is coupled to a second pair of adjustable gain circuits. The ratio of the gains of the null forming circuits is used as a control signal. Successive ratios are averaged with a variable smoothing constant and a control signal is derived from the averaged ratios.

17 Claims, 5 Drawing Sheets

(56) References Cited

OTHER PUBLICATIONS

J. Chen, J. Benesty and Y. Huang, "Performance of GCC- and AMDF-based time-delay estimation in practical reverberant environments," *EURASIP Journal on Applied Signal Processing*, vol. 2005, pp. 25-36.

J. Chen, J. Benesty and Y. Huang, "Time delay estimation in room acoustic environments: An overview," *EURASIP Journal on Appiled Signal Processing*, vol. 2006, Article ID 26503, pp. 1-19.

S. Srinivasan, and, K. Janse, "Spatial audio activity detection for hearing aids," *IEEE International Conference on Acoustics Speech, and Signal Processing*, ICASSP-2008, Apr. 2008.

* cited by examiner

ESTIMATING DIRECTION OF ARRIVAL FROM PLURAL MICROPHONES

BACKGROUND OF THE INVENTION

This invention relates to audio signal processing and, in particular, to a circuit that estimates direction of arrival using plural microphones.

As used herein, "telephone" is a generic term for a communication device that utilizes, directly or indirectly, a dial tone from a licensed service provider. For the sake of simplicity, the invention is described in the context of a telephone but has broader utility; e.g. communication devices that do not utilize a dial tone, such as radio frequency transceivers or intercoms.

This invention finds use in many applications where the internal electronics is essentially the same but the external appearance of the device is different. FIG. 1 illustrates a conference phone or speaker phone such as found in business offices. Telephone 10 includes microphones 11, 12, 13, and speaker 15 in a sculptured case.

FIG. 2 illustrates what is known as a hands free kit for providing audio coupling to a cellular telephone (not shown). Hands free kits come in a variety of implementations but generally include case 16, powered speaker 17 and plug 18, which fits an accessory outlet or a cigarette lighter socket in a vehicle. Case 16 may contain more than one microphone or one of the microphones (not shown) is separate and plugs into case 16. The external microphone is for placement as close to a user as possible, e.g. clipped to the visor in a vehicle. A hands free kit may also include a cable for connection to a cellular telephone or have a wireless connection, such as a Bluetooth® interface. A hands free kit in the form of a head set is powered by internal batteries but is electrically similar to the apparatus illustrated in FIG. 2.

Today, hands free communication has become accepted, even expected, by people unfamiliar with technology. Thus, hands free communication is often attempted in harsh, i.e., noisy, acoustical environments such as automobiles, airports, and restaurants. As used herein, "noise" refers to any unwanted sound, whether or not the unwanted sound is periodic, purely random, or somewhere in between. As such, noise includes background music, voices (herein referred to as "babble") of people other than the desired speaker, tire noise, wind noise, and so on. Automobiles can be especially noisy environments, which makes the invention particularly useful for hands free kits. Moreover, the noise will often be loud relative to the desired speech. Hence, it is essential to reduce noise in order to improve the quality of a conversation.

Many digital signal processing techniques have been proposed for reducing noise. In products with a single microphone, reducing noise is quite difficult when the desired speech and the noise share the same frequency spectrum. It is difficult for these techniques to remove noise without damaging the desired speech.

If the origin of the noise and the origin of the desired speech are spatially separated, then one can theoretically extract a clean speech signal from a noisy speech signal. A spatial separation algorithm needs more than one microphone to obtain the information that is necessary to extract the clean speech signal. Many spatial domain algorithms have been widely used in other applications, such as radio frequency (RF) antennas. The algorithms designed for other applications can be used for speech but not directly. For example, algorithms designed for RF antennas assume that the desired signal is narrow band. Speech is relatively broad band, 0-8 kHz. Other known algorithms are based on Independent Component Analysis (ICA). Using two or more microphones will improve the noise reduction performance of a hands free kit whether a spatial separation algorithm or an ICA based algorithm is used. The invention is based on a variation of a spatial separation algorithm.

FIG. 3 illustrates a classic spatial separation system in which the signal from a first microphone is filtered in an adaptive filter and subtracted from the signal from a second microphone; e.g. see U.S. Pat. No. 7,146,013 (Saito et al.). A control loop, indicated by the dashed line, adjusts filter parameters for minimal noise.

Because a signal can be analog or digital, a block diagram can be interpreted as hardware, software, e.g. a flow chart, or a mixture of hardware and software. Programming a microprocessor is well within the ability of those of ordinary skill in the art, either individually or in groups.

Those of skill in the art recognize that, once an analog signal is converted to digital form, all subsequent operations can take place in one or more suitably programmed microprocessors. Use of the word "signal", for example, does not necessarily mean either an analog signal or a digital signal. Data in memory, even a single bit, can be a signal. A signal stored in memory is accessible by the entire system, not just the function or block with which it is most closely associated. Those of skill in the art know that "subtraction" in binary is addition (one number is inverted, incremented, and added to the other). Where the inversion takes place is a matter of design. For this reason, a plus sign is used to represent combining two or more signals.

FIG. 4 illustrates another spatial separation system wherein voice activity detector 31 enables adaptation by filter 32 when voice is detected; e.g. see U.S. Pat. No. 7,218,741 (Balan et al.). FIG. 5 is yet another spatial separation system wherein direction of arrival is used to enable adaptation when sound is detected in the look direction; e.g. see U.S. Pat. No. 7,426,464 (Hui et al.).

An outline of Spatial Separation Algorithms is as follows.

- Active Noise Cancellation
- Beam Former
  - Fixed
    - Delay and Sum
    - Filter and Sum
  - Adaptive
  - Generalized Side Lobe Cancellation (GSC)
    - fixed beam former
    - blocking matrix
      - delay and subtract beam former
    - plural input adaptive filters In FIG. 6, fixed beam former 41 forms a beam towards a look direction. The performance of fixed beam former 41 is not sufficient because of beam width, due to side lobes in the beam. The main objective of GSC is to reduce the side lobe levels, hence the name. The GSC uses blocking matrix 42 that forms a null beam in the look direction. If there is no reverberation, the output of blocking matrix 42 should not contain any signals that are coming from the look direction.

Blocking matrix 42 can take many forms. For example, with two microphones, the signal from one microphone is delayed an appropriate amount to align the outputs in time. The outputs are subtracted to remove all the signals that are coming from the look direction, forming a null. This is also known as a delay and subtract beam former. If the number of microphones is more than two, then adjacent microphones are time aligned and subtracted to produce (n−1) outputs. In ideal conditions, all the (n−1) outputs should contain signals arriving from directions other than the look direction. The (n−1) outputs from blocking matrix 42 serve as inputs to (n−1)

adaptive filters to cancel out the signals that leaked through the side lobes of the fixed beam former. The outputs of (n−1) adaptive filters are subtracted from the fixed beam former output in subtraction circuit 43. The filters and subtraction circuit are collectively referred to as multiple input canceller 44.

The outputs of blocking matrix 42 will often contain some desired speech due to mismatches in the phase relationships of the microphones and the gains of the amplifiers (not shown) coupled to the microphones. Reverberation also causes problems. If the adaptive filters are adapting at all times, then they will train to speech from the blocking matrix, causing distortion at the subtraction stage.

Using a voice activity detector for control increases the sensitivity of a system to the quality of the detector. Similarly, using direction of arrival for control places a premium on accurately detecting direction, particularly if combined with voice activity detection. Thus, there is a need in the art for more accurately determining voice and direction.

In view of the foregoing, it is therefore an object of the invention to provide improved noise suppression using plural microphones.

Another object of the invention is to provide a method and apparatus for more accurately determining direction of arrival in a noise suppression circuit.

A further object of the invention is to provide improved control of adaptation in noise suppression circuits.

SUMMARY OF THE INVENTION

The foregoing objects are achieved in this invention in which a noise suppression system includes plural microphones, a fixed beam former, a blocking matrix, plural adaptive filters, and a direction of arrival circuit coupled to the adaptive filters that prevents the filters from adapting in the presence of a signal in the look direction. The direction of arrival circuit causes the filters to adapt more quickly in the absence of a signal in the look direction. A pair of adjustable gain circuits is coupled to each microphone. A first adjustable gain circuit from each pair is calibrated during the presence of a desired signal and a second adjustable gain circuit from each pair is calibrated during the presence of an interfering signal. The system also includes at least one null-forming circuit. The gain of the null forming circuit is used as a control signal. Successive data are averaged, preferably with a smoothing constant that changes with the magnitude of the ratio, for providing the control signal. In a preferred embodiment, two null circuits, one of which is adjustable, are coupled to separate pairs of adjustable gain circuits. The ratio of the outputs of the two null circuits is used as the control signal.

BRIEF DESCRIPTION OF THE DRAWINGS

A more complete understanding of the invention can be obtained by considering the following detailed description in conjunction with the accompanying drawings, in which.

DETAILED DESCRIPTION OF THE INVENTION

Basic Technology

Figure 1:
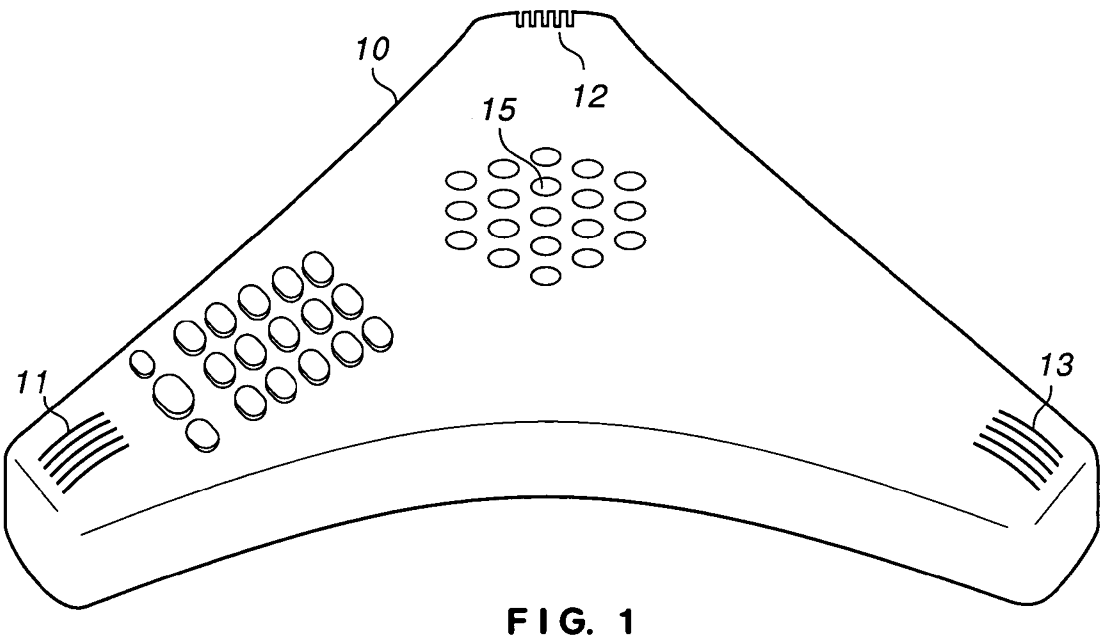
FIG. 1 is a perspective view of a conference phone or a speaker phone.
Figure 2:
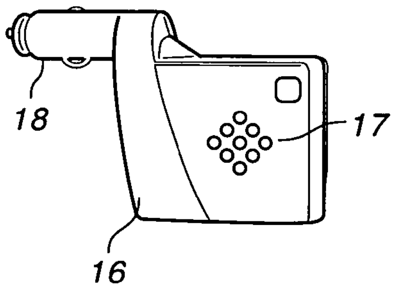
FIG. 2 is a perspective view of a hands free kit.
Figure 3:
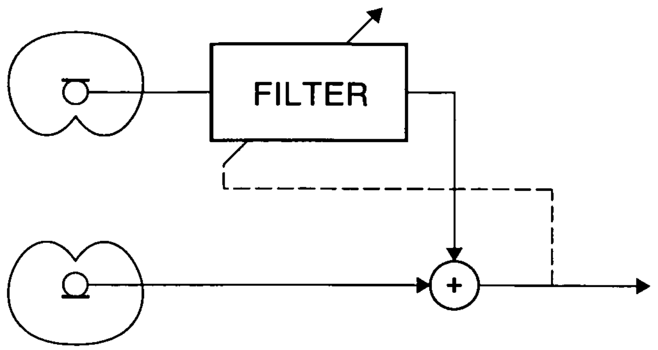
FIG. 3 (PRIOR ART)
FIG. 3 is a block diagram of a noise suppression circuit using spatial separation.
Figure 4:
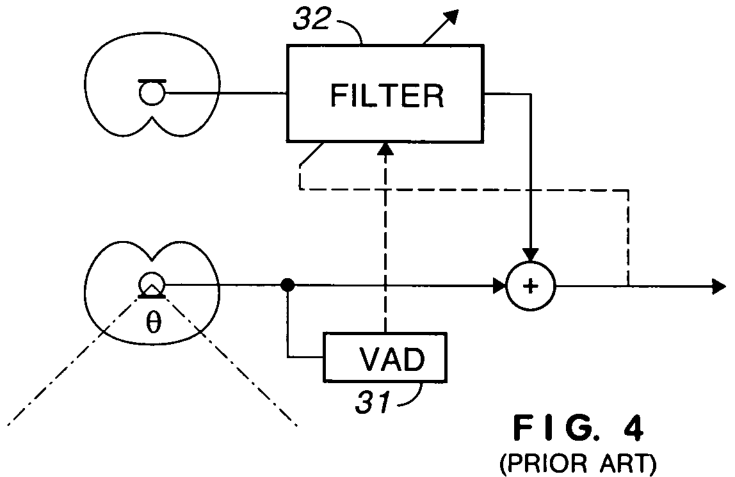
FIG. 4 (PRIOR ART)
FIG. 4 is a block diagram of a noise suppression circuit in which a voice activity detector controls an adaptive filter.
Figure 5:
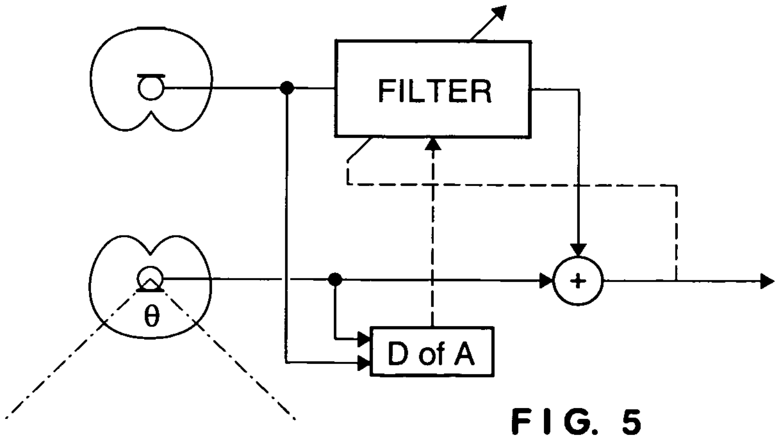
FIG. 5 (PRIOR ART)
FIG. 5 is a block diagram of a noise suppression circuit in which a direction of arrival estimator controls an adaptive filter.
Figure 6:
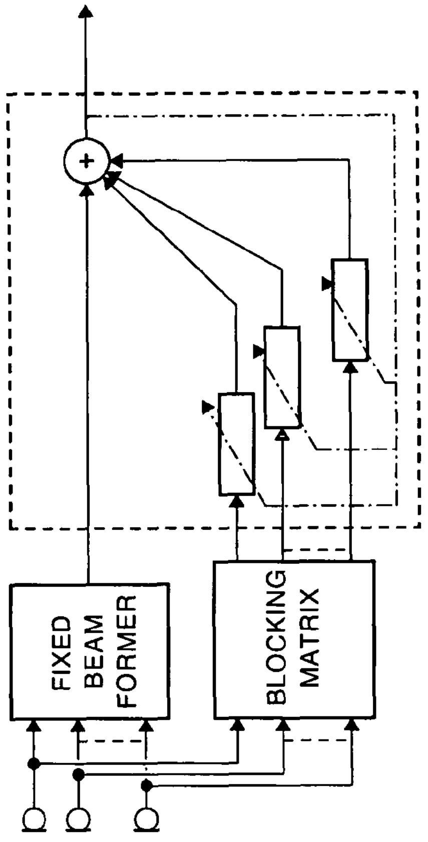
FIG. 6 (Prior Art)
FIG. 6 is a block diagram of a noise suppression circuit using generalized side lobe cancellation.

The direction for arrival is generally estimated by first estimating the time difference of arrival (TDOA) between the sensors. Specifically, for a linear microphone array, if d is the distance between the microphones, direction of arrival θ and time difference of arrival τ are related by $$\theta = \sin^{-1}\left(\frac{c\tau}{d}\right).$$

where c is the velocity of sound in air, which is equal to 346 m/sec at 77° F. (25° C.).

Many different techniques are available to estimate TDOA. Some of the techniques include, cross-correlation, absolute magnitude difference function (AMDF), least mean square (LMS), beam-steering, signal energy difference between beam-former/null-former input and output, subspace based methods and blind system identification.

The cross-correlation based method works by simply computing the cross-correlation between microphones and picking the lag corresponding to the maximum cross-correlation value.

The AMDF-based method is very similar to the cross-correlation-based methods. In the AMDF-based methods, the absolute magnitude difference between the two microphone signals is computed and the lag corresponding to minimum AMDF value is selected as the TDOA estimate.

In the LMS method, the TDOA estimate is obtained by minimizing the mean-square error between the first microphone signal and second microphone signal. In other words, the second microphone signal is modeled as a filtered version of the first microphone signal. Specifically, the delay estimate is obtained by picking the tap number corresponding to the maximum value of the estimated impulse response of a LMS-based, finite impulse response filter.

The beam-steering based methods work by forming multiple beams from the multiple microphone signals with the maximum response angle set at different directions. The output energies of these beam formers are then computed and the angle corresponding to maximum energy is selected as the direction of arrival estimator. In this method, the time difference of arrival is implicitly used during the beam-forming stage.

Another method that is closely related to beam-steering method is the one that forms a set null-former in different directions and measuring the signal loss between the null-former input and output. The null-former corresponding to maximum signal loss is picked, and its corresponding null direction is selected as the direction of arrival estimator.

The sub-space based methods are one of the most popular algorithms used in antenna arrays. Algorithms such as "MUSIC" and "ESPRIT" use the singular value decomposition of the spatial correlation matrix to estimate the direction of arrival. However, with only two microphones the sub-space based methods will not provide a good direction of arrival estimate.

The blind system identification based methods work by estimating the impulse response between original source location and the microphone locations. The impulse response estimation is performed without any information about the source location with respect to the microphone array. Once the impulse response between the source and the microphone is estimated, then it is easy to estimate the TDOA from the peak location of the two impulse responses.

Two factors to be considered in selecting the appropriate algorithm are performance in noisy environments and in reverberant environments. In a reverberant environment, the signal from a single source may arrive at the microphone array from different directions due to reflections along the signal propagation path. The severity of this multi-path effect will degrade the TDOA estimator and the algorithm should gracefully degrade as the severity increases. Another factor that should be considered is computational cost. Beam-steering based methods are computationally expensive because one needs to form multiple beams depending on the angular resolution of the DOA estimator.

Many studies have been conducted and it is widely accepted that the generalized cross-correlation method is robust in both noisy and reverberant environments. The generalized cross-correlation (GCC) method is based upon the well-known paper by C. H. Knapp and G. C. Carter, "The generalized correlation method for estimation of time delay", *IEEE Trans. Acoust. Speech Signal Process.*, vol. ASSP-24, pp. 320-327, August 1976.

For a two microphone array, the GCC function is given by $$r_{x1x2}(m,l)=\sum_{k=1}^{N}[W_1(k)X_1(m,k)][W_2(k)X_2(m,k)]*e^{\frac{j2\pi kl}{N}},$$

where $X_1(m,k)$ and $X_2(m,k)$ are the discrete Fourier transform (DFT) of the signals from the first microphone and the second microphone, respectively, at time instant m; k is the frequency index; $W_1(k)$ and $W_2(k)$ are arbitrary window function; * denotes the conjugate operation; and l is the lag index. The GCC function will have a global maximum value at the lag corresponding to the relative delay between the microphones. The TDOA can then be estimated using the following.

$$\hat{\tau}=\underset{l\epsilon D}{\operatorname{argmax}}\, r_{x1x2}(m,l)$$

where D is the range of potential TDOA estimate restricted by the inter microphone spacing. The goal of the arbitrary window function is to emphasize the generalized cross-correlation at the true TDOA. The most popular window function is given by $$W_1(k)W_2(k)=\frac{1}{|X_1(m,k)X_2(m,k)|}.$$

The GCC function using the above window function is called a PHAT (phase transform) algorithm. The PHAT weighting flattens the spectrum to equally emphasize all frequencies. The PHAT weighted cross-spectrum entirely depends on the channel characteristics. For this reason, the PHAT algorithm is found to be empirically more consistent than other statistically optimal weighting methods. Experiments also show that PHAT is more robust in reverberant environments when compared with other types of weighting functions.

Figure 7:
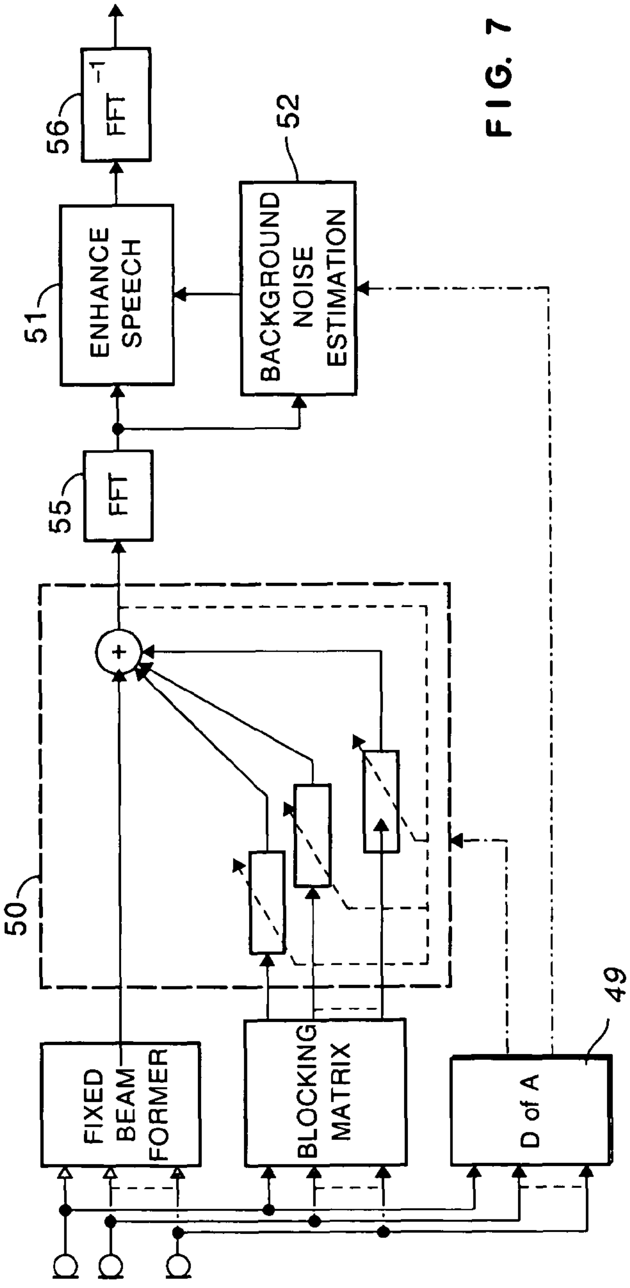
FIG. 7 is a block diagram of a preferred embodiment of the invention.

In accordance with the invention, as illustrated in FIG. 7, direction of arrival detector 49 controls the operation of the plurality of adaptive filters 50. Specifically, the filters are prevented from adapting when a desired signal is within the look direction of the microphones. The detector must have as few false positives and as few false negatives as possible because an error affects all subsequent signal processing.

In accordance with the invention, direction of arrival information is also used to control single channel signal processing, such as speech enhancement circuit 51. A background noise estimate from circuit 52 is subtracted from the signal from adaptive filters 50 to reduce noise. Circuits 51 and 52 operate in frequency domain, as indicated by fast Fourier transform circuit 55 and inverse fast Fourier transform circuit 56.

Figure 8:
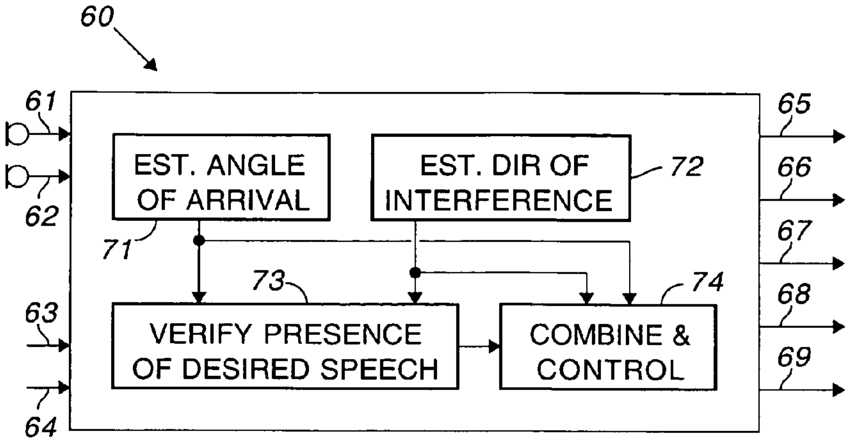
FIG. 8 is a block diagram of a direction of arrival estimator constructed in accordance with the invention.

Direction of Arrival Estimator—FIG. 8

A direction of arrival estimator estimates the angle of arrival of an incoming signal towards a microphone array and decides if the incoming signal is desired speech or interference. If the look direction is known then one can cancel the interference signals coming from other directions.

Estimator 60 has four inputs. Microphone 61 produces a first input signal and microphone 62 produces a second input signal. The number of microphones is a matter of design and the system is easily modified for more that two microphones and for various spatial arrangements of the microphones. Two microphones is a minimum system.

Data representing the look direction, e.g. 90°, is coupled to third input 63. Data representing the virtual spacing between the microphones is coupled to fourth input 64. Virtual spacing includes the actual physical distance between the microphones and the extra distance traveled by the sound because of the position of a microphone in a given housing. The extra distance traveled by the sound is also influenced by the position of the microphone vent in a product.

Estimator 60 has five outputs. Output 65 is an output control signal that enables adaptation of multi-channel, GSC based algorithms. Output 66 can be used to control the adaptation rate of single channel, noise estimation algorithms. Output 67 and output 68 provide the direction of arrival estimate of the incoming signal and the interference direction respectively. Output 69 is proportional to the ratio between interfering signal energy and desired signal energy.

Block 71 uses a generalized cross-correlation function to estimate the direction of signal arrival. Block 72 uses a generalized cross-correlation function to estimate the direction of interference. The direction of interference is computed based on prior information about the expected direction of arrival of a desired signal. If the direction of arrival estimate is not within a tolerance range of the desired direction, then the DOA estimate is used as the direction of interference.

Block 73 validates or verifies the presence of desired speech based on the DOA estimate and a null-former using the estimated direction of interference.

Block 74 derives the necessary control signals for GSC-based, multi-channel noise cancellation and noise estimation for single channel noise reduction algorithms.

Figure 9:
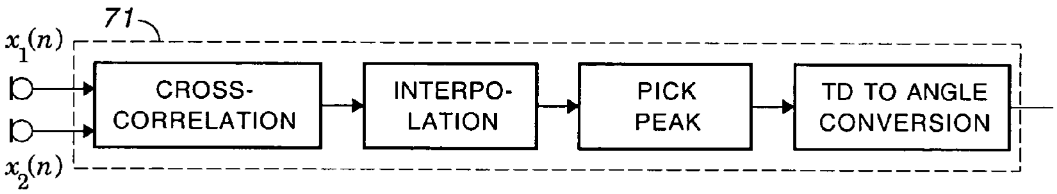
FIG. 9 is a block diagram of an angle of arrival estimator constructed in accordance with the invention.

Estimating Angle of Arrival—FIG. 9

FIG. 9 illustrates the contents of block 71 (FIG. 8). The DOA estimate is obtained using the windowed cross-correlation method. The incoming data samples are buffered to form a super-frame of size L. The windowed cross-correlation function for a given super-frame at mth super-frame index is computed using $$r_{x1x2}[m, l] = \sum_{n=0}^{L-1} w_1[n]x_1[m, n]w_2[n]x_2[m, n-l].$$

where l is the lag index, $w_1[n]$ and $w_2[n]$ are the window sequences.

In one embodiment of the invention, by way of example only, a Hanning window was used to obtain a smoothed cross-correlation estimate. The super-frame size L was set at 16 ms (128 samples at 8 kHz sampling frequency) with 75% overlap. This means that the cross-correlation should be computed every 4 ms. The cross-correlation could be computed in frequency domain. It was found that, in a specific headset application, PHAT weighting resulted in greater error in estimation in very noisy environments. In headset applications, because the user's mouth is very close to the microphone array, there is little reverberation. Therefore, one can emphasize countering a noisy environment as opposed to reverberant environment. Under these circumstances, it has been found that GCC without PHAT weighting provides the best result in a very noisy environment. A hands free kit in a different location would change the emphasis.

The range of l in the above equation depends on the microphone spacing (d). Specifically, the range is given by samples, where $F_s$ corresponds to sampling frequency and c is the speed of sound. For example, if d=50 mm, $F_s$=8 kHz, and c=346 m/sec, the range is [−1.15, 1.15] samples. If the lag resolution is one sample, then we have to compute only three cross-correlation values, which translates into one of three possible angular values namely (−90°, 0°, and +90°). The angular resolution in the above case is 90°. Based on this example, it is clear that the cross-correlation lag resolution must be greater than one sample to estimate the TDOA accurately. In order to increase the angular resolution, we have to increase the lag resolution also. One way to increase the lag resolution is by up-sampling the input data and then computing cross-correlation. For example, if $F_s$=64 kHz, then the lag range becomes [−9.25, +9.25] samples. This translates into an angular resolution equal to 11°. However, up-sampling increases the complexity of the computation.

Another method for increasing angular resolution is interpolation. In one embodiment of the invention, a third order Lagrange polynomial function is used to interpolate the cross-correlation values for non-integer lags. If $(x_1, y_1)$, $(x_2, y_2)$, $(x_3, y_3)$, and $(x_4, y_4)$ are the ordered pairs, the function value $f(x_{(2,3)})$ in the interval (2,3) can be interpolated using the third order Lagrange polynomial function given by $$f(x_{(2,3)}) = \prod_{j\neq 1}\left(\frac{x-x_j}{x_1-x_j}\right)y_1 + \prod_{j\neq 2}\left(\frac{x-x_j}{x_2-x_j}\right)y_2 + \prod_{j\neq 3}\left(\frac{x-x_j}{x_3-x_j}\right)y_3 + \prod_{j\neq 4}\left(\frac{x-x_j}{x_4-x_j}\right)y_4.$$

Figure 10:
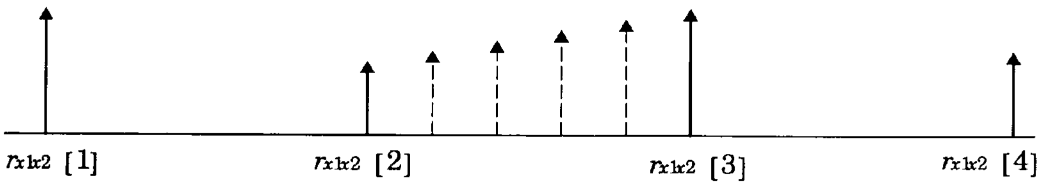
FIG. 10 is a chart illustrating the operation of the apparatus illustrated in FIG. 9.

Using the above equation, the range of cross-correlation lags that should be computed is given by $$\left[-\frac{dF_s}{c}, \frac{dF_s}{c}\right]$$

samples. In FIG. 10, the cross-correlation values for 2.2, 2.4, 2.6, 2.8 are interpolated using $r_{x1x2}$ [1], $r_{x1x2}$ [2], $r_{x1x2}$ [3], and $r_{x1x2}$ [4]. The interpolation rate in this example is five. In an actual embodiment of the invention, the interpolation rate is sixteen. Other rates could be used instead.

After interpolating the cross-correlation values, the next step involves picking the lag ($l_{max}$) corresponding to the maximum cross-correlation value. The selected lag index is then converted into an angular value by using the following formula, $$\theta = \sin^{-1}\left(\frac{cl_{max}}{dF_s}\right).$$

To reduce the estimation error due to outliers, the DOA estimate is median filtered to provide a smoothed version of the raw DOA estimate. The median filter window size is set at three.

Estimating Direction of Interference

The look direction is input signal 63 to DOA block 60. If the estimated DOA is within some tolerance range from the look direction, e.g. ±45°, then it is decided that the incoming signal is coming from the desired direction. The tolerance range is taken from a table of operating parameters stored in memory. If the DOA estimate is outside this range, then the interference direction in block 72 is updated with the present smoothed DOA estimate. This interference direction is then buffered to provide the smoothed estimate at a predetermined rate. In one embodiment of the invention, the buffer size is set at thirty frames. This means that the smoothed interference direction is updated every 120 ms. When the incoming signal is detected as coming from the look direction, a flag is set.

Verifying the Presence of Desired Speech

It has been found that the error in detecting, using cross-correlation, the presence of desired speech, coming from a preset look direction, is high when the ratio of the desired signal to an interference signal is low, e.g., less than 3 dB. Also, the DOA estimate switches between desired and interference direction at a faster rate than when the ratio is greater. In accordance with another aspect of the invention, these problems are overcome by using a set of null-formers to determine whether or not the incoming signal is coming from the look direction.

Figure 11:
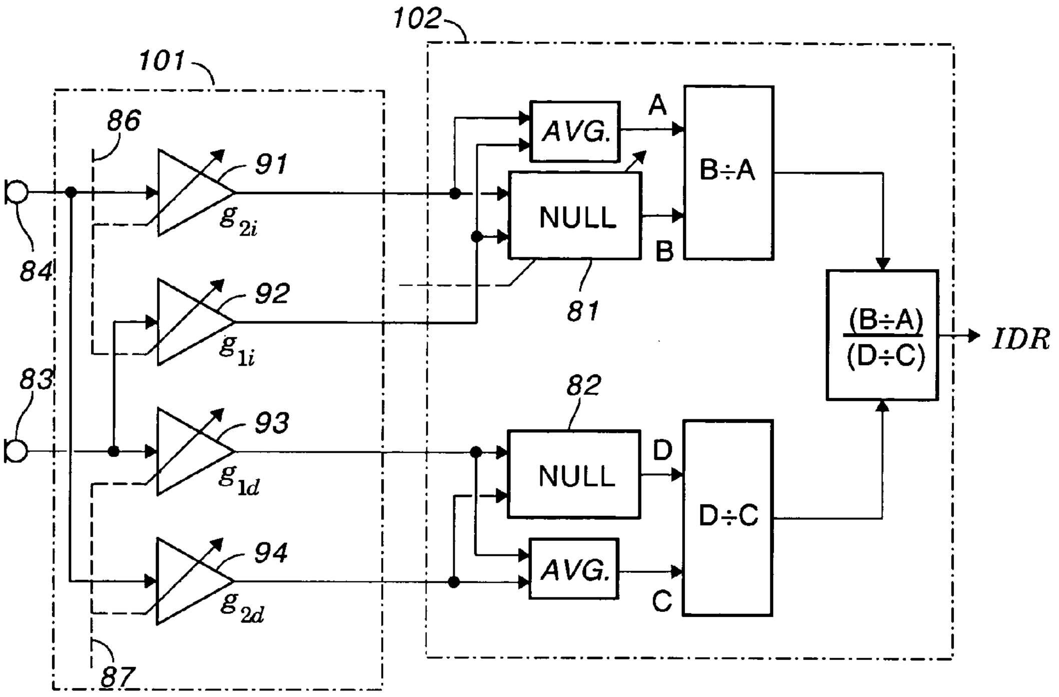
FIG. 11 is a block diagram of a circuit for producing a control signal in accordance with a preferred embodiment of the invention.

FIG. 11 is a block diagram of an apparatus or method for using two null-formers to validate the presence of desired speech. Initially, null-former 81 is set to form a null in the direction of interference. That is, a signal from the direction of interference is minimized. Ideally, if the interference direction estimator is exact, and if there is only one interfering signal coming from that direction, the output of this null-former should be very small. In accordance with another aspect of the invention, the gain of the null-former (ratio of output to input) is used as an indicator of the presence of interference. If the ratio is very small, then there is a strong interference signal. The signals from the two microphones are averaged for determining the ratio.

Similarly, null-former 82 forms a null in the look direction. That is, a signal from the desired direction is minimized. In this case, the gain provides an indication of the presence of desired speech. Usually, the look direction is fixed for a given application, e.g. 90°. On the other hand, null-former 81 is adjustable and is adjusted in use. The control signal comes from line 68 (FIG. 8) and is derived from block 72 (FIG. 8).

Although the gain of either null-former can be used to decide if there is an interference signal or a desired signal, the gains are combined in accordance with yet another aspect of the invention. The combined data provides an estimate of interference to desired signal ratio (IDR). This is illustrated in simplified form in FIG. 11 as the ratio of the gains. An averaged input signal to null-former 81 is denoted as signal "A". The output signal from null-former 81 is denoted as signal "B". Thus, the gain of null-former 81 is (B÷A). Similarly, the gain of null-former 82 is (D÷C) and IDR equals (B÷A)÷(D÷C).

The output control parameters can be adjusted from aggressive to passive depending on IDR. For example, if IDR is very high (greater than a first threshold), the noise estimation process can be made to occur more quickly than usual by changing parameters for that process. One can also compare IDR with a second threshold to determine whether or not the desired speech signal is present.

In a preferred embodiment of the invention, calculating IDR also involves calibrating the microphones; specifically, the magnitude of the signals from the microphones and when to calibrate.

If $x_1$ is the output signal from microphone 83 and $x_2$ is the output signal from microphone 84, the gain $G_i$ of null-former 81 is calculated as $$G_i = \frac{E_i}{(g_{1i}E_{x1} + g_{2i}E_{x2})/2},$$

where $E_i$ is the output energy of null-former towards interference direction, $g_{1i}$ and $g_{2i}$ are the microphone calibration gains applied to first and second microphone respectively, and $E_{x1}$ and $E_{x2}$ are the input energies of the first and second microphone respectively.

Similarly the gain $G_d$ of null-former 82 is calculated as $$G_d = \frac{E_d}{(g_{1d}E_{x1} + g_{2d}E_{x2})/2},$$

where $E_d$ is the output energy of null-former towards desired direction, $g_{1d}$ and $g_{2d}$ are the microphone calibration gains applied to first and second microphone respectively. The energies are computed based on sum of weighted squares. The weights were assigned to have more emphasis on the present frame of data and less emphasis on the past frames.

Microphone calibration is used for two reasons. A first reason is to compensate for manufacturing tolerances and a second reason is to compensate for the propagation loss that occurs if the microphone spacing is comparable to the proximity of the desired speech source location to the array. In order to get maximum suppression from the null-formers (deeper null), the two input data must be matched closely for the signal coming from the null direction. Because the two null-formers have nulls pointed in two different directions, the microphone calibration is done only when there is a signal coming from the null direction.

There are four separate calibration gains ($g_{1d}$, $g_{2d}$, $g_{1i}$, and $g_{2i}$) for optimal performance. These gains are adjusted in pairs, as indicated by dashed control lines 86 and 87. Specifically, the gain of amplifier 91 is adjusted at the same time that the gain of amplifier 92 is adjusted; i.e. when a signal is from the interference direction. The gain of amplifier 93 is adjusted at the same time that the gain of amplifier 94 is adjusted; i.e. when a signal is from the look direction. The signals on control lines 86 and 87 are derived from block 71 (FIG. 8). If the estimated angle is outside some tolerance range from the look direction, then the signal on line 86 is true and the signal on line 87 is false. Otherwise, the signal on line 86 is false and the signal on line 87 is true.

Using $G_i$ and $G_d$, IDR is calculated as $$IDR = \frac{G_d}{G_i}.$$

Finally the IDR is exponentially smoothed using fast decay and slow attack scheme. Specifically, smoothed IDR is given by $$\text{smoothed}IDR(n) = \text{smoothed}IDR(n-1)\epsilon + (1-\epsilon)IDR,$$

a standard smoothing technique except that ε, the smoothing constant, is equal to 0.9 if the present IDR is smaller than the past smoothed IDR and equal to 0.1 if the present IDR is greater than the past smoothed IDR. This fast decay and slow attack scheme detects the presence of desired speech more quickly in the presence of interfering speech.

Control Signals

The DOA estimate and the detection of desired speech presence are used to generate control signals. Two signals are generated by the control logic. The Boolean signal mmAdaptEn is true only when the desired signal is absent. This decision is based on two criteria derived from the DOA estimate and IDR. The following table shows the conditional states of this control signal.

| mmAdaptEn | Condition |
| --- | --- |
| FALSE | When the DOA estimate is within the tolerance range (look direction ± θ) |
| | (or) |
| | DOA estimate is outside the tolerance range but the IDR is less than some threshold |
| TRUE | DOA estimate is outside the tolerance range and the IDR is greater than some threshold |
| | (or) |
| | DOA estimate is outside the tolerance range continuously for some prescribed period of time |

The second control signal, nrNoiseEstRate, is meant to vary the adaptation rate of any exponential averaging based background noise estimation algorithms. The noise estimate is a key component in any single channel noise reduction/speech enhancement algorithms. Most of the existing noise estimation algorithms do not provide the true characteristics of the background noise if the environment is varying. Realistic examples of these non-stationary environments are restaurant, background music etc. If there is no desired speech at any given instant, then a noise estimation algorithm can adapt more aggressively to background noise, whether it is stationary or not. The adaptation rate is based on criteria similar to the first control signal discussed above. The following table shows the conditional states of this control signal.

| nrNoiseEstRate | Condition |
|---|---|
| 0.995 | When the DOA estimate is within the tolerance range (look direction ± θ) (or) DOA estimate is outside the tolerance range but the IDR is less than some threshold |
| 0.985/0.97/0.8 | DOA estimate is outside the tolerance range and IDR is greater than one of two thereholds |
| 0.8 | DOA estimate is outside the tolerance range continuously for some prescribed amount of time |

In this specific implementation, smaller values of nrNoiseEstRate means faster adaptation rate. In general, one can easily modify the logic to take on values that are more suitable for the underlying noise estimation algorithms. For example, one method could simply be a binary decision in which the noise estimation algorithm will update the present frame of data as background noise if the output from DOA block is set to zero.

The IDR is usually around 0 dB if the interference is a diffused noise. This will result in fewer adaptations even though the diffused noise should be estimated as background noise. The IDR is 0 dB because the directivity index of a null-former using two microphones is around 6 dB. Therefore, in a diffused noise environment, the null-former gain from both null-formers is around −6 dB and their ratio is 0 dB. To counter this problem, background noise estimation is enabled if the smoothed DOA estimate is outside a tolerance range continuously for a specific period of time. In one embodiment of the invention, the period was 48 ms.

Figure 12:
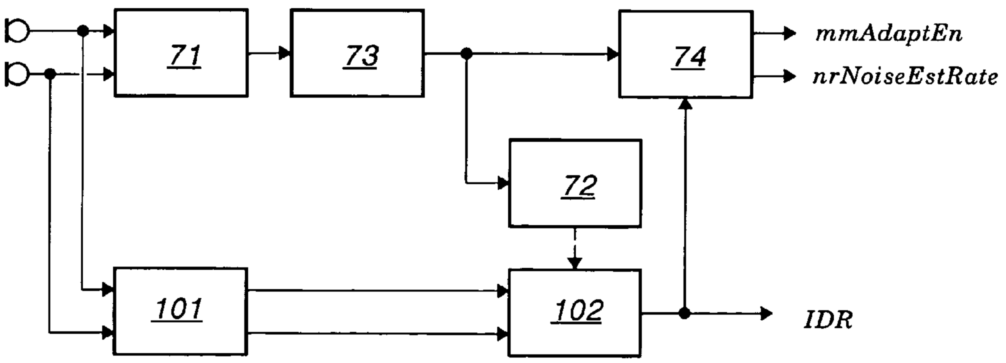
FIG. 12 is a block diagram of a noise suppression system constructed in accordance with a preferred embodiment of the invention.

FIG. 12 illustrates the arrangement of the blocks shown previously in detail The invention thus provides improved noise suppression using plural microphones. The invention also more accurately determines direction of arrival by calibrating the microphones for signals in the look direction and in the interference direction, by using null-formers to verify that a signal is coming from the look direction, by adapting filters in the absence of desired speech, by changing E in response to changes in IDR, and by adapting when the DOA estimate is outside a specified range. The invention also provides improved control of adaptation in noise suppression circuits by providing variable control signals for causing noise suppression to adapt more aggressively when there is no desired speech in the look direction.

Having thus described the invention, it will be apparent to those of skill in the art that various modifications can be made within the scope of the invention. For example, specific numerical examples are for example only, depending upon a specific implementation of the invention and changing, for example, with the type of hands free kit containing the invention.

What is claimed as the invention is:

1. A method for suppressing noise in a communication device having at least first and second microphones and a direction of arrival circuit coupled to the microphones, said method comprising the steps of:

providing first and second variable gain circuits for the first microphone, the gain of the first and second variable gain circuits being adjustable, each of the first and second variable gain circuits providing an output;

providing third and fourth variable gain circuits for the second microphone, the gain of the third and fourth variable gain circuits being adjustable, each of the third and fourth variable gain circuits providing an output;

adjusting the gain of the first, second, third and fourth variable gain circuits based on data from the direction of arrival circuit, said adjusting step including the steps of:

calibrating the first and third variable gain circuits during the presence of a desired signal;

calibrating the second and fourth variable gain circuits during the presence of an interfering signal; and combining the outputs from the first, second, third and fourth variable gain circuits.

2. A method for suppressing noise in a communication device having plural microphones, said method comprising the steps of:

providing a first null-forming circuit coupled to the microphones, the first null-forming circuit providing a first null-forming output;

averaging the signals from the microphones to produce an average;

determining the gain of the first null-forming circuit as the ratio of the first null-forming output to the average; and using data representing the gain of the first null-forming circuit as a control signal in a noise suppression circuit.

3. The method as set forth in claim 2 and further including the steps of:

providing a second null-forming circuit coupled to the microphones;

determining the gain of the second null-forming circuit;

determining the ratio of the gain of the first null-forming circuit to the gain of the second null-forming circuit; and instead of using data representing the gain of the first null-forming circuit as a control signal, using data representing the ratio as a control signal in a noise suppression circuit.

4. The method as set forth in claim 3 and further including the step of:

verifying the direction of arrival estimate based upon the data representing said ratio by comparing the data with a threshold.

5. The method as set forth in claim 3, wherein said communication device includes a direction of arrival circuit and the second null-forming circuit is adaptive, and further including the step of:

adjusting the null direction of the second null-forming circuit based upon a signal from the direction of arrival circuit.

6. A noise suppression system comprising in combination:

a first microphone;

a second microphone;

a fixed beam former coupled to the first microphone and to the second microphone;

a blocking matrix coupled to the first microphone and to the second microphone;

at least one adaptive filter coupled to the blocking matrix;

a subtraction circuit coupled to the output of the fixed beam former and to the output of the at least one adaptive filter;

a direction of arrival circuit, coupled to said first microphone, to said second microphone, and to said at least one adaptive filter, the direction of arrival circuit preventing the at least one adaptive filter from adapting in the presence of a signal in the look direction of the direction of arrival circuit;

a first pair of adjustable gain circuits for the first microphone; and a second pair of adjustable gain circuits for the second microphone.

7. The noise suppression system as set forth in claim 6 wherein a first adjustable gain circuit from each pair is calibrated during the presence of a desired signal and a second adjustable gain circuit from each pair is calibrated during the presence of an interfering signal.

8. The noise suppression system as set forth in claim 6 and further including:

a null-forming circuit coupled to a first adjustable gain circuit from each pair; and a gain determining circuit coupled to the input and the output of the null-forming circuit;

wherein data representing gain is a control signal in said noise suppression system.

9. The noise suppression system as set forth in claim 8 wherein said data is averaged with a smoothing constant that changes with the magnitude of the data.

10. The noise suppression system as set forth in claim 6 and further including:

a first null-forming circuit coupled to a first adjustable gain circuit from each pair;

a first gain determining circuit coupled to the input and the output of the first null-forming circuit;

a second null-forming circuit coupled to a second adjustable gain circuit from each pair;

a second gain determining circuit coupled to the input and the output of the second null-forming circuit;

a ratio detector coupled to the output of the first gain determining circuit and to the output of the second gain determining circuit and including an output providing an interference-to-desired-signal-ratio signal;

wherein said interference-to-desired-signal-ratio signal is a control signal in said noise suppression system.

11. The noise suppression system as set forth in claim 10 wherein said said interference-to-desired-signal-ratio signal is averaged with a smoothing constant that changes with the magnitude of the data.

12. The noise suppression system as set forth in claim 10 wherein said direction of arrival circuit causes the at least one adaptive filter to adapt more quickly in the absence of a signal in the look direction than when a signal is present in the look direction.

13. A noise suppression system comprising in combination:

a first microphone;

a second microphone;

a fixed beam former coupled to the first microphone and to the second microphone;

a blocking matrix coupled to the first microphone and to the second microphone;

at least one adaptive filter coupled to the blocking matrix;

a subtraction circuit coupled to the output of the fixed beam former and to the output of the at least one adaptive filter;

a direction of arrival circuit, coupled to said first microphone, to said second microphone, and to said at least one adaptive filter, the direction of arrival circuit preventing the at least one adaptive filter from adapting in the presence of a signal in the look direction of the direction of arrival circuit; and a single channel signal processing circuit having an adaptation rate, wherein information from the direction of arrival circuit controls the adaptation rate of the single channel signal processing circuit.

14. The noise suppression system as set forth in claim 13, wherein the signal processing circuit is a spectral subtraction circuit and the direction of arrival circuit inhibits subtraction when a signal is detected in the look direction.

15. A circuit for identifying the presence of a desired signal, said circuit comprising:

a first input coupled to a source of desired signal;

a second input coupled to a source of interfering signal;

a first null former coupled to the first input and to the second input and having a first output;

a first averaging circuit coupled to the first input and to the second input and having a second output;

a first ratio detector coupled to the first output and to the second output and producing a first ratio signal representing the ratio of the signals on the first output and the second output.

16. The circuit as set forth in claim 15 and further including:

a second null former coupled to the first input and to the second input and having a third output;

a second ratio detector coupled to the second output and to the third output and producing a second ratio signal representing the ratio of the signals on the second output and the third output;

a third ratio detector coupled to the first ratio detector and to the second ratio detector, said third ratio detector producing a signal indicative of the presence of a desired signal;

wherein the gain of the first null former is proportional to the ratio of the signal on the first input to the sum of the signals on the first input and the second input, and the gain of the second null former is proportional to the ratio of the signal on the second input to the sum of the signals on the first input and the second input.

17. The circuit as set forth in claim 15 and further including:

a second null former coupled to the first input and to the second input and having a third output;

a second averaging circuit coupled to the first input and to he second input and having a fourth output;

a second ratio detector coupled to the third output and to the fourth output and producing a second ratio signal representing the ratio of the signals on the third output and the fourth output;

a third ratio detector coupled to the first ratio detector and to the second ratio detector, said third ratio detector producing a signal indicative of the presence of a desired signal;

wherein the gain of the first null former is proportional to the ratio of the signal on the first input to the sum of the signals on the first input and the second input, and the gain of the second null former is proportional to the ratio of the signal on the second input to the sum of the signals on the first input and the second input.

* * * * *